United States Patent [19]

Paruso et al.

[11] 4,208,475
[45] Jun. 17, 1980

[54] METHOD OF FORMING SODIUM BETA-AL$_2$O$_3$ SOLID MATERIALS

[75] Inventors: Deborah M. Paruso, Monroeville; Bulent E. Yoldas, Churchill Boro, both of Pa.

[73] Assignee: Westinghouse Electric Corp., Pittsburgh, Pa.

[21] Appl. No.: 974,175

[22] Filed: Dec. 28, 1978

[51] Int. Cl.$^2$ .............................................. H01M 2/00
[52] U.S. Cl. ...................................... 429/193; 264/66
[58] Field of Search ................ 429/193, 191, 104, 30; 264/66, 61, 65; 106/62, 73.4, 46, 58, 63

[56] References Cited

U.S. PATENT DOCUMENTS

| | | | |
|---|---|---|---|
| 3,895,963 | 7/1975 | McGowan et al. | 429/193 X |
| 3,959,022 | 5/1976 | DeJonghe et al. | 429/193 |
| 4,082,826 | 4/1978 | Iijima | 429/193 X |

Primary Examiner—Anthony Skapars
Attorney, Agent, or Firm—D. P. Cillo

[57] ABSTRACT

A liquid polymer is formed in a low temperature polymerization reaction involving organo-metallic sodium and aluminum compounds, at least one of which is partially hydrolyzed. The polymer is hydrolyzed, dried to form an amorphous sodium Beta-alumina precursor, and then heated, at between 1,200° C. and about 1,550° C., to form a ceramic, comprising ion-conductive sodium Beta-alumina which is useful as a solid electrolyte.

10 Claims, 3 Drawing Figures

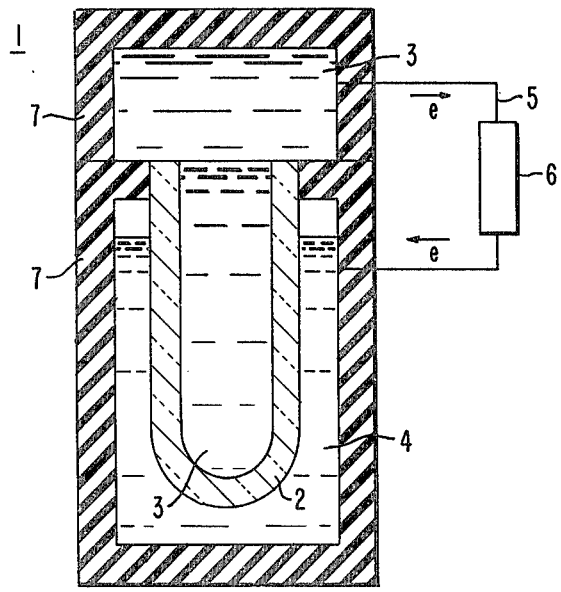
FIG. 1
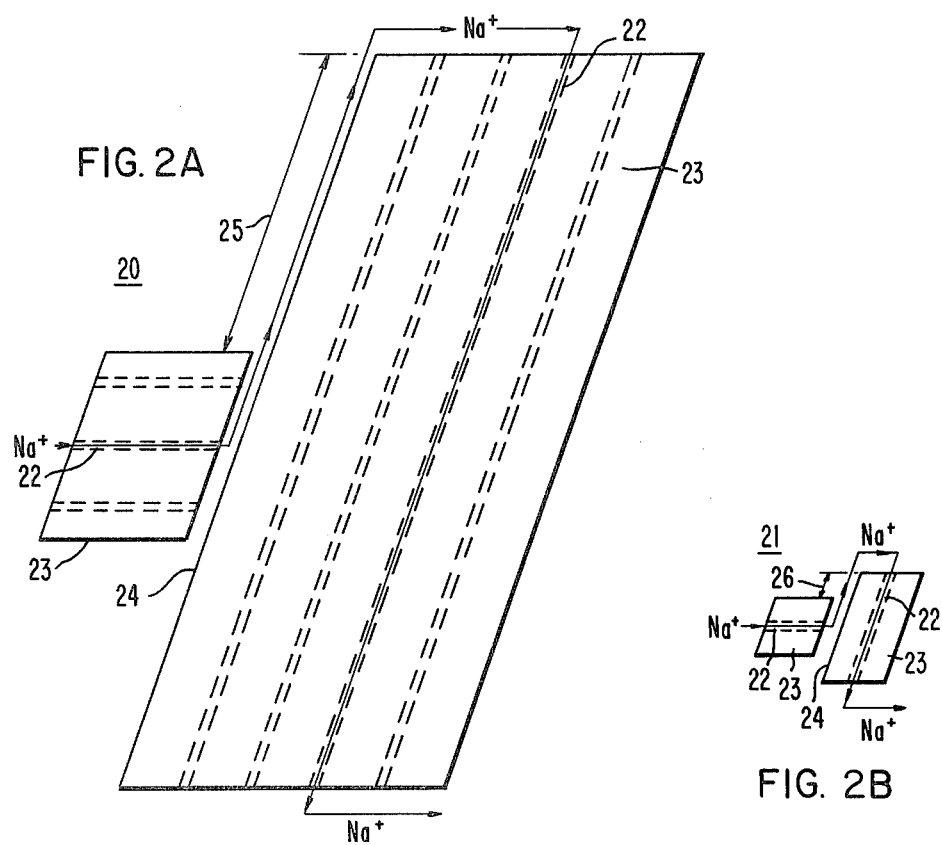
FIG. 2A
FIG. 2B ary, shown in the accompanying drawings,
METHOD OF FORMING SODIUM BETA-AL₂O₃ SOLID MATERIALS

GOVERNMENT CONTRACT

The Government has rights in this invention pursuant to Contract No. DAAG-29-77-C-0029 awarded by the Department of the Army.

BACKGROUND OF THE INVENTION

Beta-alumina was first reported by Rankin and Merwin in 1916. However, extensive research on this material did not take place until fifty years later, when its use as a solid electrolyte for the sodium-sulfur battery was investigated. Sodium Beta-alumina exhibits the unique property of having a high sodium ion conductivity at 300° C., which is the temperature at which the sodium-sulfur battery is operated.

Sodium Beta-alumina is a highly ion-conductive ceramic which can be represented by the chemical formula: $Na_2O \cdot xAl_2O_3$, where x can vary between 5 and 11. Sodium Beta-alumina powder is generally produced by reaction fusion of $Al_2O_3$ powder with $Na_2O$ in the form of a sodium salt, at 1,250° C. to 1,550° C., to form $Na_2O \cdot xAl_2O_3$, as described by Iijima, in U.S. Pat. No. 4,082,826. The sodium Beta-alumina powder is then formed into the desired electrolyte shape, and sintered at up to 1,750° C. DeJonghe et al., in U.S. Pat. No. 3,959,022, reduced sintering temperatures by first forming a eutectic mixture of sodium-aluminum oxide, in which the atom ratio of sodium to aluminum is 0.54. This eutectic mixture is added to sodium Beta-alumina powder and the additive mixture is heated at about 1,600° C., to achieve reactive liquid phase sintering.

The grain size and purity of sodium Beta-alumina are extremely important factors influencing its ion conductivity and performance as a solid electrolyte. The high temperature fusion method of formation, where Al and Na are reacted in the solid state at from 1,250° C. to about 1,550° C., generally produces undesirable grain growth and purity problems.

The grains produced by this prior heat reactive method, generally have a random orientation and average dimensions of between about 1 to 3 microns. This type of structure allows grain boundary blockage of adjacent conduction layers, causing long ion migration paths and reducing the total conductivity of the material. During final sintering, grain growth increases even more. What is needed is an improved method of producing sodium Beta-alumina which will provide small grains of high purity, and increased sodium ion conductivity.

SUMMARY OF THE INVENTION

The above problems are solved and the above need is met by forming a consolidated ceramic body by the following steps: (A) reacting, in a liquid alcohol or other suitable solvent medium, a first alkoxide compound selected from the group consisting of Na(OR) and Al(OR)₃ where R is an alkyl group containing from 1 to 6 carbon atoms, at a temperature below the boiling point of the solvent medium, with an amount of water effective to leave a substantial number of (OR) groups unreacted, prevent precipitation of hydroxyl complexes, and form a first partially hydrolyzed alkoxide compound, (B) reacting, in a liquid alcohol or other suitable solvent medium, the first partially hydrolyzed alkoxide compound, at a temperature below the boiling point of the lowest boiling solvent medium, with an organo metallic compound selected from the group consisting of (a) a second alkoxide selected from the group consisting of Na(OR) and Al(OR)₃ where R is an alkyl group containing from 1 to 6 carbon atoms, where the second alkoxide compound is different from the first alkoxide compound or (b) a second partially hydrolyzed alkoxide compound, containing a substantial number of unreacted (OR) groups where R is an alkyl group containing from 1 to 6 carbon atoms, selected from the group consisting of partially hydrolyzed sodium alkoxide compounds and partially hydrolyzed aluminum alkoxide compounds where the second partially hydrolyzed alkoxide compound is different from the first partially hydrolyzed alkoxide compound; so that a Na compound is reacted with an Al compound to form alcohol and a liquid polymer containing Na, Al, and (OR) groups, where the Na and Al compounds are added in an amount effective to provide a sodium Beta-alumina precursor, (C) adding an amount of water to the precursor effective to hydrolyze substantially all of the remaining carbon containing organic groups in the precursor, to form a mixture of alcohols and hydrolyzed sodium Beta-alumina precursor, (D) removing alcohol to form an amorphous sodium Beta-alumina precursor, (E) heating the amorphous sodium Beta-alumina precursor at between 1,200° C. and about 1,550° C., to cause a phase change and formation of ceramic material comprising crystalline sodium Beta-alumina, having a grain structure with substantially all of the grain dimensions between about 0.1 micron and about 0.85 micron, where the mole ratio of Na:Al is from 1:5 to 11, (F) forming the ceramic material into a suitable shape, and (G) sintering the formed ceramic at a temperature and for a time effective to provide a consolidated body. An effective amount of a heat stabilizer may optionally be added in step (A) or (B).

BRIEF DESCRIPTION OF THE DRAWINGS

For a better understanding of the invention, reference may be made to the preferred embodiments, exemplary of the invention, shown in the accompanying drawings, in which:

FIG. 1 is a schematic diagram of one embodiment of a sodium-sulfur battery employing the formed, tubular Beta-alumina solid electrolyte of this invention, and FIGS. 2A and 2B are a simplified, highly magnified schematic illustration of the prior art sodium Beta-alumina crystal structure (A) and the crystal structure of sodium Beta-alumina formed by the method of this invention (B).

DESCRIPTION OF THE PREFERRED EMBODIMENTS

Referring now to FIG. 1 of the drawings, one embodiment of a sodium-sulfur battery 1 is shown. The sodium Beta-alumina solid electrolyte tube 2 separates molten sodium 3 (melting point 98° C.) from molten sulfur 4 (melts at 119° C.). The molten sodium is the negative active material, while the molten sulfur (charged) is the positive active material. Electrical connections 5, load 6 and thermal insulation 7 are also shown.

On discharge, at about a 300° C. operating temperature, sodium ions pass through the sodium Beta-alumina solid electrolyte separating the liquid active material, where they react with the sulfur anions to form sodium polysulfides, which are also liquid at 300° C. The maximum available energy density of this type system is about 300 Wh/kg compared to about 40 Wh/kg for advanced lead-acid systems. Such sodium-sulfur energy systems are compact, and may be useful in advanced vehicle propulsion.

In the method of this invention, liquid sodium Beta-alumina precursor is formed in low temperature polymerization reaction involving effective amounts of organometallic sodium and aluminum compounds, at least one of which is partially hydrolyzed. The precursor is hydrolyzed, dried to form an amorphous solid and then heated, at between 1,200° C. and about 1,550° C., to form a highly sodium ion-conductive sodium Beta-alumina ceramic.

Initially, in the preferred reactions, a first alkoxide selected from sodium alkoxide and aluminum alkoxide is dissolved in a compatible solvent, preferably an alcohol, such as isopropyl alcohol (b.p. 82.3° C.) or secbutyl alcohol (b.p. 99.5° C.), at a concentration up to saturation. This solution of alkoxide is then partially hydrolyzed by water at a temperature up to the boiling point of the solvent medium, but preferably up to about 35° C., according to either of the reactions set forth below:

$$Al(OR)_3 + H_2O \rightarrow Al(OR)_2(OH) + alcohols \quad (1)$$

or $$Na(OR) + H_2O \rightarrow Na(OR)_x(OH)_{1-x} + alcohols \quad (1')$$

where R is an alkyl group having from 1 to 6 carbon atoms. The reacton is most preferably conducted at 25° C. to conserve energy. Each R group may be independently selected if desired although they are usually the same. The R group is preferably ethyl, isopropyl or butyl because these alkoxides are commercially available and inexpensive. The preferred sodium alkoxide is sodium iso-propoxide (NaOCH(CH$_3$)$_2$) and the preferred aluminum alkoxide is aluminum sec-butoxide (Al(OC$_4$H$_9$)$_3$).

The term "partially hydrolyzed" is herein defined as meaning that the water must be added in an amount that is effective to react with some but not all, i.e., about 30% to about 90% of the alkoxide (OR) groups; otherwise there will be self-condensation and precipitation of hydroxyl complexes. The resulting partially hydrolyzed reaction product must contain from about 10% to about 70% active alkoxide groups that are free for further reaction.

The partially hydrolyzed reaction product, containing active alkoxide groups is then reacted with a solution of a second alkoxide selected from sodium alkoxide and aluminum alkoxide, dissolved in a compatible second solvent, preferably an alcohol, at a concentration up to saturation, where the second alkoxide metal ion is not the same as the first alkoxide metal ion. This reaction is carried out at a temperature up to the boiling point of the lowest boiling solvent. In this and in the prior reaction, the solvent medium is important in providing hydrolysis reaction and polymerization homogeneity at the molecular level. This homgeneity contributes to small grain structures upon heating the precursor from 1,200° C. to about 1,550° C. The molar amount of Na and Al in the compounds used in this polymerization reaction is such as to provide a mole ratio of Na:Al of from 1:5 to 11 in the final sodium Beta-alumina crystals. An effective amount of added Na to provide a particular crystalline mole ratio may require up to a 40 molar % excess of Na.

The term "effective amount of Na and Al compound" is meant to include such excess amount of Na, to insure complete reaction upon heating the precursor between 1,200° C. to about 1,550° C., and to reach the required Na:Al mole ratio of 1:5 to 11 in the final crystallized sodium Beta-alumina. The precursor polymer may thus contain an excess of Na. This excess of Na will be lost during crystallization heating. In this step, the hydroxyl groups of the partially hydrolyzed reaction product react with the alkyl groups of the second alkoxide, and a liquid, polymerized, sodium Beta-alumina precursor is formed according to either of the reactions set forth below:

$$11Al(OR)_2(OH) + Na(OR') \rightarrow sodium\ Beta\text{-}alumina$$
$$precursor + alcohols \quad (2)$$

$$Na(OR)_x(OH)_{1-x} + 11Al(OR')_3 \rightarrow sodium$$
$$Beta\text{-}alumina\ precursor + alcohols \quad (2')$$

where R' is an alkyl group having from 1 to 6 carbon atoms. It shoud be understood that partial hydrolysis of Al(OR')$_3$ need not involve exactly one bond, i.e., Al(OR)$_2$(OH). It can be Al(OR)$_{3-Y}$ where y is a number on the average of slightly less than 3 and more than 1/11. If it is 3, all bonds are hydrolyzed; if it is less than 1/11, not all the sodium can react with it. As a practical matter, to allow for loss of Na and/or incomplete reaction, up to 40 mole % excess of Na materials can be used. Reactions (1) and (2) are preferred since Na, which can easily absorb moisture, is added last.

In some cases it may be desirable to partially hydrolyze both the sodium alkoxide and the aluminum alkoxide as preferably shown in steps (1) and (1') and then add them together in step (2") as shown below:

$$11Al(OR)_2(OH) + Na(OR)_x(OH)_{1-x} \rightarrow sodium$$
$$Beta\text{-}alumina\ precursors + alcohols \quad (2'')$$

The sodium Beta-alumina precursor, in liquid form, consists of polymer chains such as Na—O—Al=(OR')$_2$ with the aforementioned appropriate molar amounts of Na and Al. Na and Al are reacted in this step, in a solvent medium, rather than during a heating step, and this provides small grain structures upon drying and heat crystallization, and minimizes abnormal grain growth during sintering. If either R or R' in the reactions shown above contains over 6 carbon atoms, it will not easily go into solution.

After this polymerization takes place, water is added in an amount effective to hydrolyze and liberate any remaining carbon containing (OR) or (OR') organic groups by forming alcohols and forming a hydroxide complex. The resulting Beta-alumina precursor consists of polymer chains such as (OH)$_2$=Al—O—Na.

Upon removal of the alcohols by room temperature evaporation or by heating, the liquid polymerized sodium Beta-alumina precursor forms an amorphous transition oxide sodium Beta-alumina precursor material, generally in fragmented particulate form. When this material is heated between 1,200° C. to about 1,550° C., phase transformation to crystalline, ceramic sodium Beta-alumina takes place:

$$sodium\ Beta\text{-}alumina\ precursor + heat \rightarrow sodium$$
$$Beta\text{-}alumina\ (crystalline) \quad (3)$$

Heating below 1,200° C. will result in incomplete phase change. Heating over about 1,550° C. results in initiation of sodium loss. The preferred range is between 1,200° C. and about 1,300° C.

The sodium Beta-alumina ceramic formed after crystallization heating can be expressed by the generic chemical formula $Na_2O \cdot xAl_2O_3$. It can include two ceramic types: sodium beta-$Al_2O_3$ (where X=9 to 11), and sodium beta''—$Al_2O_3$ (where x=5 to 7). Where x=8, a two-phase system results. The term sodium Beta-alumina is herein defined to mean either of these sodium beta or sodium beta'' types, their combination or mixture, or other types of sodium containing aluminas. The preferred material, because of its high ionic conductivity, is the sodium beta''-$Al_2O_3$ type. Correct formulation and temperature control in the method of this invention can allow production of 100% of each type.

In some instances, it may be desirable to add an oxygen containing Li, K, or Mg metallic compound, at some point in the process, preferably in the initial mixing of the first alkoxide with alcohol. This compound is added in an amount effective to increase heat stability of the sodium Beta-alumina. These compounds can comprise up to about 10 wt.%, but generally between about ¼ wt.% to about 3 wt.% of the additive ingredient. A heat stabilizer may be used at high temperatures, because as sodium is lost during crystallization heating the sodium Beta-alumina can revert toward Alpha-alumina ($Al_2O_3$). Suitable oxygen containing metallic heat stabilizers are well known in the art and include alkoxides, oxides and carbonates, such as, for example, $LiOCH_3$, $K_2CO_3$, MgO and the like. The term "sodium Beta-alumina" is herein meant to also include such minor amounts of heat stabilizers as may be added in the process.

The sodium Beta-$Al_2O_3$ type ceramic has a structure composed of Gamma-alumina-like blocks bridged by layers containing only ¼ as many oxygen anions as are present in the (111) planes of blocks. Monovalent cations lie in tunnels resulting from this oxygen deficiency, and cations in adjacent tunnels form a hexagonal pattern. Between 15% and 30% of the possible Na+ sites are filled. Conduction occurs only in the conductive bridging layers, which are 11.3 Angstrom units apart in sodium beta-$Al_2O_3$. The sodium beta''-$Al_2O_3$ type ceramic has a structure where the Alpha-alumina blocks are rotated about a three-fold screw axis normal to the bridging layers. This produces rhombohedral symmetry accompanied by an increased distance between conductive bridging layers to 11.6 Angstrom units. This phase has been shown to be unstable above about 1,550° C.

Referring to FIGS. 2A and 2B of the drawings crystalline grain structures are shown in highly magnified, simplified schematic form. The prior art grain structure is shown as 20, and the smaller, uniform, homogeneous grain structure formed by the method of the invention is shown as 21. Sodium ions are shown in their migration through the crystal structure of the solid electrolyte. Conductive bridging layers shown in simplified form as 22 penetrate through the ceramic grains 23. The grains are shown in random orientation. It is to be understood that the drawing is in simplified form. In an actual crystal such as 20 or 21, there would be hundreds of conductive layers 22. In FIG. 2A the grains present a very long sodium ion migration path 25 along the grain boundary 24 reducing total sodium ion conductivity. The mixture of similarly small grains shown in FIG. 2B, made by the method of this invention, provides minimal blockage with resulting short sodium ion migration path 26 along the grain boundary.

In the method of this invention, utilizing low temperature polymerization of organometallic sodium and aluminum compounds, a mixture of small grains of substantially the same size are formed in the ceramic after heating the sodium Beta-alumina precursor between 1,200° C. and about 1,550° C. Substantially all of the grain dimensions, herein defined as the average distance between the edges of the grains, will range from about 0.1 micron to 0.2 micron at crystallization temperatures of 1,200° C., to about 0.85 micron at crystallization temperatures of about 1,550° C. Upon subsequent sintering at about 1,600° C. to about 1,750° C., the grain dimensions will only increase up to about 0.95 micron, i.e., 9,500 Angstrom units. At about 1,200° C. the grains have a substantially round particulate structure. At about 1,550° C. the grains tend to have a needlelike intermixed structure, indicating substantial grain growth.

The crystalline sodium Beta-alumina, which may contain an effective amount of a heat stabilizing Li, Mg or K metal, is crushed and ground by any suitable technique to produce a powder of the desired particle size. An effective amount, generally from about 0.1 wt.% to about 10 wt.% based on the powder weight, of organic binder is then mixed with the powder so that the powder is capable of being formed into the desired shape. Suitable binders include acrylic resins, rubber, starch or other binding materials known in the art which will burn off at sintering temperatures of about 1,600° C.

The mixture, preferably as a wet paste, is then formed by a suitable extrusion, molding or other technique into a flat, closed tube or other desired shape. The formed body is then sintered for about 5 minutes to about 90 minutes, at about 1,600° C. to about 1,750° C., by any conventional method to form a consolidated, solid body of sodium Beta-alumina ceramic. Preferably, the sintering is at as low a temperature as possible and takes place in a $Na_2O$ alkaline atmosphere. This atmosphere can be produced by placing a sodium salt which will decompose at the sintering temperature in the sintering means. The binders used as well as the molding and sintering techniques are well known in the art, and reference may be made to U.S. Pat. No. 4,082,826, herein incorporated by reference, for further details in these areas.

EXAMPLE 1

A highly ion-conductive ceramic material was made. Two and one-half grams of 99.9% pure sodium isopropoxide was dissolved in anhydrous isopropyl alcohol solvent in a beaker to form a sodium solution. An isopropyl alcohol solution containing 0.547 gram of distilled water was added to the sodium solution to cause a partial hydrolysis reaction and form a partially hydrolyzed sodium alkoxide. No precipitate was formed so that at least 10% of the alkoxide groups remained unreacted. This mixture provided a 25% excess of sodium, an amount effective to ensure complete formation of crystalline sodium Beta-alumina. Then, 65.76 grams of 99.9% pure aluminum sec-butoxide was dissolved in anhydrous isopropyl alcohol solvent, and the solution added to the partially hydrolyzed sodium alkoxide solution, with vigorous mixing, to form a liquid, viscous, polymerized sodium Beta-alumina precursor. All of the above addition and mixing was at a temperature of about 25° C.

Excess distilled water was then added to the liquid, polymerized Beta-alumina precursor to hydrolyze any remaining alkoxide group. The alcohol which had risen to the top of the beaker was evaporated, leaving a dry, fragmented, particulate, amorphous material. A sample of this material was placed in a refractory crucible and heated in a resistance furnace until the temperature reached 1,200° C., to cause crystallization. After the temperature of the material had been maintained at 1,200° C. for 1 hour, it was removed from the furnace. For comparative purposes another sample was heated to 1,650° C. for 1 hour.

Samples of the crystalline ceramic material heated to 1,200° C. were pulverized and subjected to an X-ray diffusion analysis which showed substantially 100% pure ion-conductive sodium Beta-alumina. Scanning electron micrographs showed a substantially round, particulate, homogeneous grain structure having grain dimensions of about 0.18 micron, i.e., 1,800 Angstrom units. The sodium Beta-alumina formed was a mixture of sodium beta-alumina and sodium beta"-alumina. The comparative sample heated to 1,650° C. was also pulverized and subjected to an X-ray diffraction analysis which showed only 56% sodium Beta-alumina with 44% Alpha-alumina, indicating the importance of crystallization of temperatures below about 1,550° C. Electron micrographs of the comprative sample showed a substantial amount of elongated grain structures over about 1 micron, i.e., 10,000 Angstrom units in grain dimensions.

The 100% sodium Beta-alumina powder could be mixed with a suitable binder to form a wet paste, extruded into a closed tube shape and sintered in a sodium atmosphere at about 1,600° C., to provide a consolidated, sodium-ion conductive solid electrolyte, suitable for use in sodium-sulfur batteries. The powder could also be further heat stabilized with Li, K, or Mg added as an effective amount of oxide, carbonate or alkoxide in the initial alcohol dissolution stage. The use of alcohol or other suitable solvent medium to provide liquid phase reaction and mixing insures a homogeneous final product.

We claim:

1. A method of making a highly ion-conductive ceramic material, which comprises the steps of:
   (A) reacting, in a liquid solvent medium, a first partially hydrolyzed alkoxide compound selected from the group consisting of partially hydrolyzed sodium alkoxide and partially hydrolyzed aluminum alkoxide, with an organo-metallic compound selected from the group consisting of (a) an alkoxide compound selected from the group consisting of sodium alkoxide and aluminum alkoxide, where the metal ion of the second alkoxide compound is different from the metal ion of the first partially hydrolyzed alkoxide compound, and (b) a second partially hydrolyzed alkoxide compound selected from the group consisting of partially hydrolyzed sodium alkoxide and partially hydrolyzed aluminum alkoxide, where the second partially hydrolyzed alkoxide compound is different from the first partially hydrolyzed alkoxide compound; so that a Na compound is reacted with an Al compound to form alcohol and a liquid polymer containing Na and Al,
   (B) hydrolyzing carbon containing organic groups in the polymer, to provide a mixture of alcohols and a hydrolyzed polymer,
   (C) removing alcohol from the mixture formed in step (B) to provide an amorphous sodium Beta-alumina precursor, and
   (D) heating the amorphous sodium Beta-alumina precursor for a time and at a temperature effective to cause a phase change and formation of a crystalline ceramic material comprising sodium Beta-alumina, where in step (A) the Na compound and the Al compound are added in an amount effective to provide a mole ratio of Na:Al of from 1:5 to 11 in the final crystalline ceramic formed after heating in step (D).

2. The method of claim 1, wherein the reaction temperature in step (A) is up to about 35° C., water is used in the hydrolysis of step (B), the heating step (D) is at a temperature of between 1,200° C. and about 1,550° C., and after step (D) the ceramic material is formed into a suitable solid electrolyte shape and sintered to form a consolidated, solid body.

3. The method of claim 1, wherein a metallic compound selected from the group consisting of K, Li and Mg oxygen containing compounds is added in step (A) in an amount effective to increase the heat stability of the crystalline sodium Beta-alumina, and the crystalline sodium Beta-alumina ceramic material formed in step (D) has a grain structure with substantially all of the grain dimensions between about 0.1 micron and about 0.85 micron.

4. The method of claim 1, wherein the first partially hydrolyzed alkoxide compound is selected from the group consisting of partially hydrolyzed Al(OR)$_3$, and partially hydrolyzed Na(OR), and the organo-metallic compound is selected from the group consisting of Al(OR)$_3$, Na(OR), partially hydrolyzed Al(OR)$_3$, and partially hydrolyzed Na(OR), where R in all cases is an alkyl group containing from 1 to 6 carbon atoms.

5. The method of claim 1, wherein the crystalline sodium Beta-alumina ceramic formed in step (D) is selected from the group consisting of sodium Beta-alumina ceramics having the formula Na$_2$O·xAl$_2$O$_3$ where x can vary from 5 to 7, sodium Beta-alumina ceramics having the formula Na$_2$O·xAl$_2$O$_3$ where x can vary from 9 to 11, and mixtures thereof.

6. The method of claim 1, wherein the first partially hydrolyzed alkoxide compound is partially hydrolyzed aluminum sec-butoxide, the organo-metallic compound is sodium iso-propoxide and the solvent medium is an alcohol.

7. The method of claim 1, wherein the first partially hydrolyzed alkoxide compound is partially hydrolyzed aluminum sec-butoxide and the organo-metallic compound is partially hydrolyzed sodium iso-propoxide.

8. An ion conductive ceramic material made by the method of claim 1.

9. A method of making a highly sodium ion-conductive ceramic body, useful as a solid electrolyte, by the steps of:
   (A) reacting, in a liquid alcohol medium, a first alkoxide compound selected from the group consisting of Na(OR) and Al(OR)$_3$, where R is an alkyl group containing from 1 to 6 carbon atoms, with an amount of water effective to leave a substantial number of (OR) groups unreacted and form a first partially hydrolyzed alkoxide compound, and then
   (B) reacting, in a liquid alcohol medium, the first partially hydrolyzed alkoxide compound with an organo-metallic compound selected from the group consisting of a second alkoxide compound selected from the group consisting of Na(OR) and Al(OR)$_3$, where R is an alkyl group containing from 1 to 6 carbon atoms, where the second alkoxide compound is different from the first alkoxide compound, and (b) a second partially hydrolyzed alkoxide compound formed by the reaction, in a liquid alcohol medium, of a second alkoxide compound selected from the group consisting of Na(OR) and Al(OR)$_3$, where R is an alkyl group containing from 1 to 6 carbon atoms with an amount of water effective to leave a substantial number of (OR) groups unreacted, where the second partially hydrolyzed alkoxide compound is different from the first partially hydrolyzed alkoxide compound; so that a Na compound is reacted with an Al compound to form alcohol and a liquid polymer containing Na and Al, and then (C) adding an amount of water to the polymer effective to hydrolyze carbon containing organic groups in the polymer, to provide a mixture of alcohols and a hydrolyzed polymer, and then (D) removing alcohol from the mixture formed in step (C) to provide an amorphous sodium Beta-alumina precursor, and then (E) heating the amorphous sodium Beta-alumina precursor at between 1,200° C. and about 1,550° C., to cause a phase change and formation of a crystalline ceramic material consisting essentially of sodium Beta-alumina, where in step (B) the Na compound and the Al compound are added in an amount effective to provide a mole ratio of Na:Al of from 1:5 to 11 in the final crystalline ceramic formed after heating in step (E), and then (F) forming the ceramic material into a suitable shape, and finally (G) sintering the formed ceramic at a temperature and for a time effective to provide a consolidated, solid, sodium ion-conducting electrolyte body.

10. The method of claim 9, wherein the reaction temperature in steps (A) and (B) are up to about 35° C., the heating in step (E) is at a temperature of between 1,200° C. and about 1,300° C., and the crystalline sodium Beta-alumina ceramic material formed in step (E) has a grain structure with substantially all of the grain dimensions between about 0.1 micron and about 0.85 micron.